United States Patent Office 3,489,765
Patented Jan. 13, 1970

3,489,765
1-p-CHLOROBENZOYL-2-ALDEHYDO-3-INDOLYL
ACETIC ACID DERIVATIVES
John Martin Chemerda, Watchung, and Meyer Sletzinger, North Plainfield, N.J., assignors to Merck & Co., Inc., Rahway, N.J., a corporation of New Jersey
No Drawing. Filed July 26, 1967, Ser. No. 656,008
Int. Cl. C07d 27/00
U.S. Cl. 260—326.13
4 Claims

ABSTRACT OF THE DISCLOSURE 1-p-chlorobenzoyl-2-aldehydo-3-indolyl acetic acids and the corresponding 2-hydrazones and 2-semi-carbazones. These compounds are useful as precursors in the production of 1-p-chlorobenzoyl-3-indolyl acetic acids.

---

This invention relates to a new method of preparing certain alpha-(1-aroyl-3-indolyl)alkanoic acids and to new intermediates therefor. More particularly, it relates to a method of preparing 1-p-chlorobenzoyl-2-methyl-5-methoxy-3-indolylacetic acid or 1-p-chlorobenzoyl-2-methyl-5-dimethylamino-3-indolylacetic acid. These compounds are disclosed and claimed in U.S. Patent No. 3,161,654, issued Dec. 15, 1964, to Shen.

In the Shen patent, these 1-p-chlorobenzoyl-2-methyl-3-indolylacetic acids are prepared by a series of reactions in which 3-indolylacetic acids are dehydrated to the corresponding anhydrides; the anhydrides are treated with t-butyl alcohol to give the corresponding esters; the t-butyl esters are then acylated at the 1-position with p-chlorobenzoyl chloride; and the resulting 1-acylates are converted to the free acetic acid derivatives by a pyrolysis process. It is an object of this invention to provide another process by which such indolylacetic acids can be prepared.

It has now been discovered in accordance with the present invention that 1-p-chlorobenzoyl-2-methyl-3-indolylacetic acids of the Formula I:

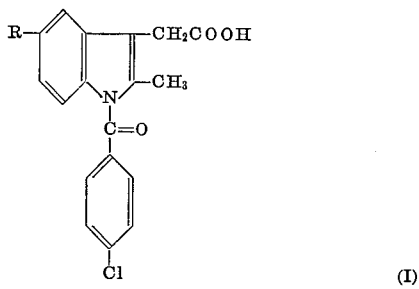

(I)

wherein R is either methoxy or dimethylamino, can be prepared from 1-p-chlorobenzoyl-2-aldehydo-3-indolylacetic acids of the formula:

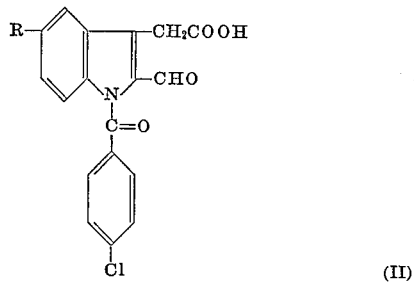

(II)

wherein R is as defined above, by a process which involves treating a compound of Formula II with either hydrazine or semicarbazide to give the corresponding 2-hydrazones or 2-semicarbazones; and subsequent reduction of the hydrazones or semicarbazones to give the desired 2-methyl derivatives of Formula I.

To practice the present invention, a compound of Formula II is mixed with hydrazine in the form of hydrazine hydrate, preferably in a solvent such as a lower alkanol (e.g., ethanol) and the reaction is allowed to proceed at ambient temperature. After the reaction has proceeded for a time sufficient to allow conversion of the aldehyde starting material to its hydrazone, depending upon the reagent used, the solvent for the reaction can be removed under reduced pressure to give the intermediate product, which is then to be converted to the desired compound of Formula I.

In preparing the hydrazone, it is desirable to use at least 2 moles of hydrazine for each mole of the compound of Formula II. In so doing, the extra mole of the hydrazine reacts with the carboxyl group on the acetic acid chain to give the corresponding hydrazine of the Formula III:

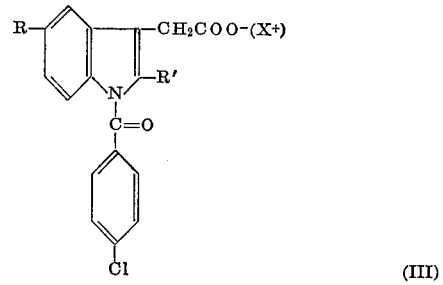

(III)

wherein R is as defined above and R' is a hydrazone or semicarbazone radical, and X is a hydrazine or semicarbazine cation.

The compounds of Formula III are converted to the desired compound of Formula I by reduction under special conditions. In accordance with this invention, the most suitable method for converting compounds of Formula III to a desired compound of Formula I comprised treating said compound of Formula III with a mixture of an alkali metal t-butoxide and dimethyl sulfoxide (DMSO). In general, about 2 moles of the butoxide should be employed for each mole of the compound of Formula III, although this ratio can be varied within limits. The reaction will normally be effected in about 8 hours, although it is feasible to maintain reaction conditions for periods as short as 4 hours or longer than 8 hours. After reaction has been completed, the reaction mixture is diluted with water and then extracted with a halogenated aliphatic hydrocarbon solvent, such as methylene chloride. The remaining aqueous phase is acidified with an acid such as hydrochloric acid to pH 5 to give the product as a precipitate. The precipitate is filtered off and purified by recrystallization from an alkanol such as t-butanol to give a desired product of Formula I in purified form.

As an alternative to the above-described procedure for producing the compounds of Formula I, it is possible to convert a compound of Formula II to its hydrazone and simultaneously reduce the hydrazone to the 2-methyl radical. In general, it is desirable, however, to conduct the conversion of the compound of Formula II by the two-step method wherein the formation of the hydrazone and its reduction are conducted in two separate operations.

The following examples are presented to further illustrate the present invention.

Example 1

A solution of 3.72 g. (0.01 mole) of 1-p-chlorobenzoyl-2-aldehydo-5-methoxy-3-indolylacetic acid in 100 ml. ethanol is treated with 0.64 g. (0.02 mole) of hydrazine. The solvent is then removed under reduced pressure to afford the hydrazine salt of the aldehyde of 1-p-chlorobenzoyl - 2 - aldehdydo - 5 - methoxy - 3 - indolylacetic acid. This intermediate is used in the following example without further purification.

By substituting 1-p-chlorobenzoyl-2-aldehydo-5-dimethylamino-3-indolylacetic acid in the foregoing procedure for the indole used therein, there is obtained the corresponding hydrazine salt of 1-p-chlorobenzoyl-2-aldehydo-5-dimethylamino-3-indolylacetic acid.

Example 2

To a rapidly stirred mixture of 2.24 g. (0.02 mole) of potassium t-butoxide and 25 ml. DMSO is added in small portiions over 8 hours 4.19 g. (0.01 mole) of the hydrazine salt prepared in Example 1. The reaction mixture is then diluted with 200 ml. of water, extracted with methylene chloride (2× 50 ml.), and the aqueous phase acidified with dilute hydrochloric acid. The crude precipitate of 1-p-chlorobenzoyl-2-methyl-5-methoxy-3-indolylacetic acid is filtered and purified by crystallization from t-butanol.

Substitution of the corresponding 5-dimethylamino indole salt in the procedure of Example 2 for the salt used therein, results in the preparation of 1-p-chlorobenzoyl-2-methyl-5-dimethylamino-3-indolylacetic acid.

Example 3

To anhydrous dimethylsulfoxide (75 ml.) pre-heated to 100° was added cautiously (foaming) anhydrous sodium bicarbonate (10 g.) followed by 1-p-chlorobenzoyl-2-tosyloxymethyl-5-methoxy-3-indolylacetic acid (5.28 g., 0.01 mole). The mixture was stirred well under nitrogen at 100° for 5 minutes, then rapidly cooled to room temperature and quenched into 500 ml. of water. After extraction with chloroform (2× 100 ml.), the aqueous phase was acidified with dilute hydrochloric acid, the precipitated 1-p-chlorobenzoyl-2-aldehydo-5-methoxy-3-indolylacetic acid filtered off and purified by crystallization from t-butanol.

The aldehyde may be prepared alternatively from the 2-hydroxymethyl derivative by oxidation with chromic anhydridepyridine complex.

Repetition of the procedure of Example 3 using the corresponding 5-dimethylamino compound in place of the indole used therein, affords the compound 1-p-chlorobenzoyl-2-aldehydo-5-dimethylamino-3-indolylacetic acid.

Example 4

This example illustrates the preparation of the 2-tosyloxy derivatives which are used as the starting materials for the preparation of the 2-aldehydo derivatives of Formula II. These syntheses are outlined in the following flow sheet and then described immediately thereafter.

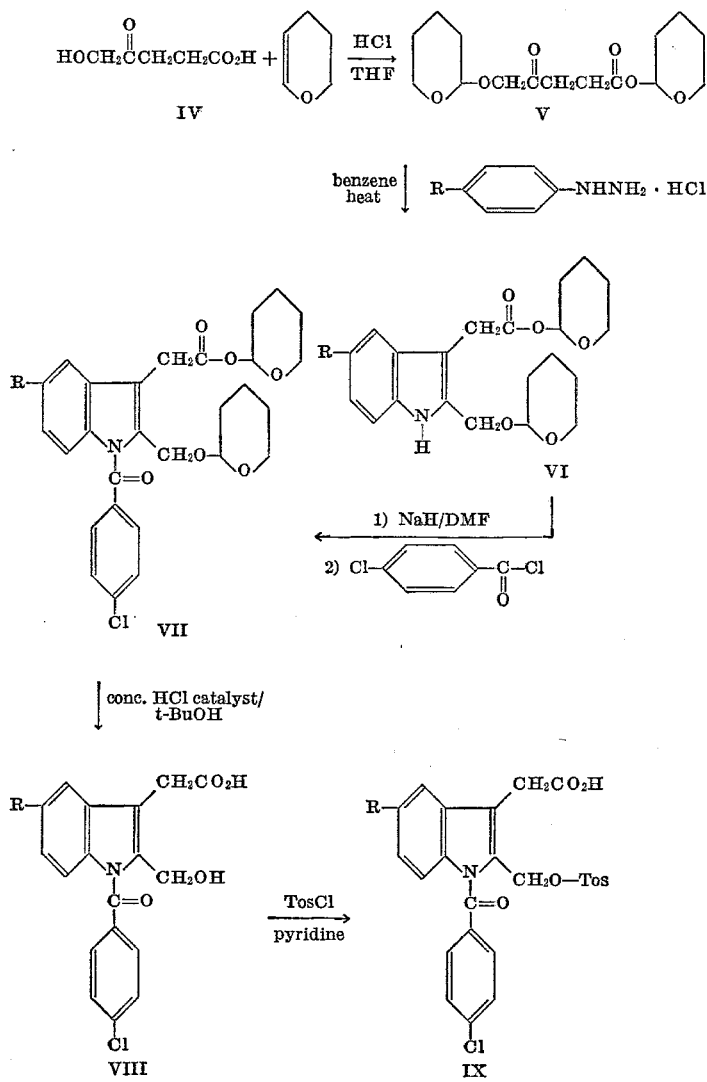

The 5-hydroxylevulinic acid pyranyl ether ester (V) is prepared from 5-hydroxylevulinic acid (IV) by treatment with 2.1 equivalents of dihydropyrane in tetrahydrofuran solution containing a few drops of concentrated hydrochloric acid catalyst. The product V is purified by distillation and then refluxed under nitrogen for five hours in anhydrous benzene with one equivalent of p-methoxyphenylhydrazine or p-dimethylaminophenylhydrazine hydrochloride. After filtration of the precipitated ammonium chloride, the benzene solvent is removed under reduced pressure, leaving pyranyl 5-R-2-pyranyloxymethyl-indole-3-acetate (VI). This is purified and then N-chlorobenzoylated by initial salt formation by treatment with sodium hydride in dimethylformamide solution followed by treatment with one equivalent of p-chlorobenzoylchloride. The resulting amide (VII) is then depyranylated by stirring with a small amount of concentrated hydrochloric acid for 5 hours at room temperature in t-butanol as solvent. The product, 1-p-chlorobenzoyl-5-R-2-hydroxymethyl-3-indolylacetic acid (VIII) crystallizes out and is removed by filtration. The hydroxy group is then converted to the p-toluenesulfonate ester by stirring for 3 hours with one equivalent of tosyl chloride in pyridine solution. Water is then added and after addition of dilute hydrochloric acid, the precipitated 1-p-chlorobenzoyl-5-methoxy-2-tosyloxymethyl-3-indolylacetic acid (IX wherein R is methoxy) or 1-p-chlorobenzoyl-5-dimethylamino-2-tosyloxymethyl-3-indolylacetic acid (IX wherein R is dimethylamino) is collected by filtration.

What is claimed is:
1. A compound of the formula:

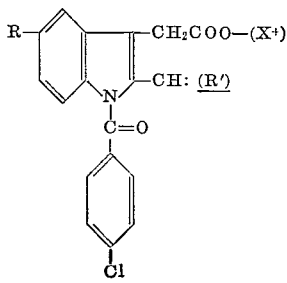

wherein:
R is methoxy or dimethylamino;
R' is semicarbazono or hydrazono; and
X is the corresponding hydrazine or semicarbazine cation.

2. The compound of claim 1 wherein R is methoxy.
3. A compound of the formula:

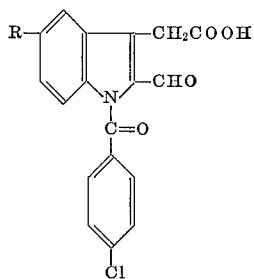

wherein R is methoxy or dimethylamino.

4. The compound of claim 3 wherein R is methoxy.

References Cited

UNITED STATES PATENTS 3,316,260  4/1967  Shen _____ 260—247.2

ALEX MAZEL, Primary Examiner
J. A. NARCAVAGE, Assistant Examiner

U.S. Cl. X.R.
260—326.14